United States Patent [19]

Lehmann et al.

[11] Patent Number: 4,924,769
[45] Date of Patent: May 15, 1990

[54] DEVICE FOR MANUFACTURING BUTTER

[75] Inventors: Hanno Lehmann; Arnold Uphus; Johannes Kreimer, all of Oelde, Fed. Rep. of Germany

[73] Assignee: Westfalia Separator Aktiengesellschaft, Oelde, Fed. Rep. of Germany

[21] Appl. No.: 333,823

[22] Filed: Apr. 4, 1989

Related U.S. Application Data

[62] Division of Ser. No. 144,831, Jan. 15, 1988, abandoned.

[30] Foreign Application Priority Data

Feb. 21, 1987 [DE] Fed. Rep. of Germany ....... 3705643

[51] Int. Cl.$^5$ ...................... A01J 15/12; A01J 17/00; A23C 17/00
[52] U.S. Cl. ........................................ 99/455; 99/453; 99/459; 99/462; 99/465
[58] Field of Search .......................... 99/452, 453–455, 99/456–459, 460, 461, 465, 495; 426/581–583, 34

[56] References Cited

U.S. PATENT DOCUMENTS

| | | | |
|---|---|---|---|
| 253,820 | 2/1882 | Kendall | 426/581 |
| 334,430 | 1/1886 | Guinnip | 426/664 |
| 1,650,625 | 11/1927 | Hapgood | 99/459 |
| 2,077,644 | 4/1937 | Schaub | 99/456 |
| 2,729,563 | 1/1956 | Goede | 426/664 |
| 2,917,827 | 12/1959 | Lankford | 99/466 |
| 3,543,403 | 12/1970 | Speglic et al. | 99/456 |
| 3,841,610 | 10/1974 | Hanzawa et al. | 99/465 |
| 4,658,711 | 4/1987 | Vennewald | 99/455 |
| 4,669,254 | 6/1987 | Muzzarelli | 99/535 |

*Primary Examiner*—Timothy F. Simone
*Attorney, Agent, or Firm*—Sprung, Horn, Kramer & Woods

[57] ABSTRACT

A method of and device for manufacturing butter. A continuous-operation mechanical churn has at least one butter-making cylinder, a buttermilk extractor, and at least one squeeze-off. Once most of the buttermilk has been extracted, fragments chopped from a block of stored butter or pure fat are accordingly introduced into the remaining mass of grain and blended with it in one of the squeeze-offs and a homogeneous billet of butter is shaped out of the mixture. At least one chopper is accordingly associated with each block of butter or fat and located above the squeeze-off that is upstream in terms of the direction that the mass of grain moves in, and the chopper has a device for advancing the block that is being chopped from.

20 Claims, 4 Drawing Sheets

4,924,769

DEVICE FOR MANUFACTURING BUTTER

This application is a division, of application Ser. No. 144,831, filed 1/15/88, abandoned.

BACKGROUND OF THE INVENTION

The instant invention concerns a device for manufacturing butter by means of a continuous-operation mechanical churn with at least one butter-making cylinder, a buttermilk extractor, and at least one squeeze-off.

Butter is, as is known, manufactured from cream obtained from milk. The constitution of the cream depends on several factors such as the type of fodder supplied to the cow, the climate, the breed of cow, etc., and in turn determines the consistency or structure of the butter. The customer of course will be interested in constant quality, which can be maintained by blending fresh and stored cream together at a particular ratio. One drawback, however, is that, since the fresh and stored cream must be blended before the cream is ripened, they must be blended in accordance with the desired quality long before the butter can be made. Furthermore, storing cream demands a lot of space and consumes a lot of power for thawing and chilling. It is accordingly more economical to blend fresh butter and stored butter or pure fat. This approach also provides more flexibility in controlling production because blending creams instead of butters demands ripening time.

SUMMARY OF THE INVENTION

One object of the present invention is accordingly to improve the method of the aforesaid type to the extent that fresh butter can be very economically blended with stored butter or pure fat in such a way that the starting products will be universally distributed throughout the final product.

Another object of the invention is to improve the device for carrying out the method in accordance with the invention to the extent that it is simple in design, reliable in operation, and can be employed as an accessory with a continuous-operation mechanical churn in such a way that no manual operations will be necessary to produce the final product.

The former object is attained in accordance with the invention by the improvement wherein, once most of the buttermilk has been extracted, fragments chopped from a block of butter or fat are introduced into the remaining mass of grain and blended with it in one of the squeeze-offs and in that a homogeneous billet of butter is shaped out of the mixture.

"Fragments of butter" will for the sake of simplicity also be considered as referring to fragments of fat in what follows.

That the stored butter to be blended with the fresh butter is supplied in fragments ensures thorough blending, and it can be assumed that the fragments will be uniformly distributed, resulting in a homogeneous final product. Once most of the buttermilk has been extracted, the fresh butter will have a loose structure. Since it is compressed in the subsequent squeeze-off, the fragments will be extremely finely distributed when introduced into the butter grain.

Since stored butter is added to the fresh butter in the method in accordance with the invention, considerably less storage capacity will be needed because butter is thicker than cream, and less power will be required to keep the space cold.

In one practical embodiment of the method, a controlled volume of fragments of butter is added in a continuous stream. This measure ensures that the specific ratio necessary to attain uniform quality can be established and that the ratio can, at any time, be reproduced.

The method in accordance with the invention can be employed with any type of butter—sweet-cream or sour-cream and sweet or salted.

The latter object is attained in a continuous-operation mechanical churn with at least one butter-making cylinder, a buttermilk extractor, and at least one squeeze-off, by the improvement wherein at least one chopper is associated with each block of butter or fat and located above the squeeze-off that is upstream in terms of the direction that the mass of grain moves in, and wherein the chopper has a device for advancing the block that is being chopped from.

The chopper or choppers ensure that the stored butter being blended with the fresh butter will be continuously supplied, as is prerequisite to uniform distribution. Since the chopper or choppers are associated with the upstream squeeze-off, it can be assumed that the buttermilk will already have been extracted. It is especially practical to position an outlet for liquid in the vicinity of the squeeze-off associated with the chopper. Associating a chopper or choppers with the upstream squeeze-off is also an advantage because the chopped stored butter will then travel through the same squeeze-off sections as the fresh butter. If there are several choppers, various types of stored butter of varying quality can blended into a homogeneous final product. The block-advance device associated with each chopper insures a uniform volumetric flow of chopped stored butter in relation to fresh butter during continuous operation. To make it possible to vary the ratio of the mixture it is practical for at least the block-advance device to have a continuously variable drive mechanism that can be employed to accelerate and decelerate the advance.

The chopper can have a hopper with its free end opening into the housing for the upstream squeeze-off.

It is practical for each chopper to consist essentially of a rotating and powered drum provided with several blades that extend over its total width with their cutting edges extending from its outer surface. This design is especially simple due to the rotation of the drum. Furthermore the fragments of the constantly advancing block will be pared off in the form of chips, with dimensions that are particularly small, enhancing uniform distribution.

It will in this context accordingly be especially practical for the edges of the blades to have recesses that leave sharp elevations. Each elevation should extend only a short distance along the width of the drum. This measure will make the pared-off fragments considerably shorter than the width of the drum. Each blade can slant down to an imaginary tangent to the circumference of the drum at the point where the blade emerges.

The pared-off fragments of butter will roll off the block more readily if a trough or gutter that is deeper than the surface of the drum and faces the cutting edge of the blade is associated with each blade.

The blades secured in the drum can be oriented at the same angle to one another.

The outside of the drum can have as many depressions, trapezoidal in cross-section, as there are blades, with a securing strip that is also trapezoidal in cross-section and can move radially fitting into each depression.

The outer and free surface of each securing strip can have a trough or gutter extending over its total length.

The walls of the trapezoidal cross-section depressions slant toward each other from the horizontal shaft of the drum and can converge toward each other.

It will be especially simple to continuously supply the blocks to the chipper if the block-advance device has a trough that accommodates a powered conveyor screw with its axis of rotation extending along the trough, and blocks of different dimensions can be handled if a block-securing plate is positioned away from the screw and can be moved toward it.

The conveyor screw can be powered by a variable drive mechanism. The block-securing plate can have at least one setting mechanism. The setting mechanism can consist essentially of a threaded bushing and spindle.

The outside diameter of the threads at the intake end of the conveyor screw can be shorter than that at the outlet end. The upstream squeeze-off can have an outlet for removing liquids in the area associated with the chopper.

It may sometimes be necessary when blending stored butter with fresh butter to chill or warm either the fresh butter or the stored butter, the latter of which is sometimes supplied frozen and requires tempering subsequent to being chopped. It is for this purpose practical for either the area of the upstream squeeze-off associated with the chopper of the chopper itself or both to have two separated demarcating walls that create a hollow chamber and for the hollow chambers to be capable of being subjected to a chilling or warming medium, preferably cold or warm water. The chopper can also have a thawing system and the chopper can have one or more channels for supplying additives.

The speeds of the mechanical-churn drive mechanisms and the speed of the cream-pump drive mechanism can be independently regulated, preferably by programmable controls.

Several choppers, each for one block of butter or fat, can be positioned upstream of the upstream squeeze-off.

The proportions of the mixture of fresh butter and stored butter or pure fat can be varied by entering the requisite parameters in a computer, which computes a value that regulates the speed of the block-advance mechanism in relation to the amount of fresh butter being supplied.

BRIEF DESCRIPTION OF THE DRAWINGS

The invention will now be described with reference to the drawings, wherein.

DETAILED DESCRIPTION OF THE INVENTION

Figure 1:
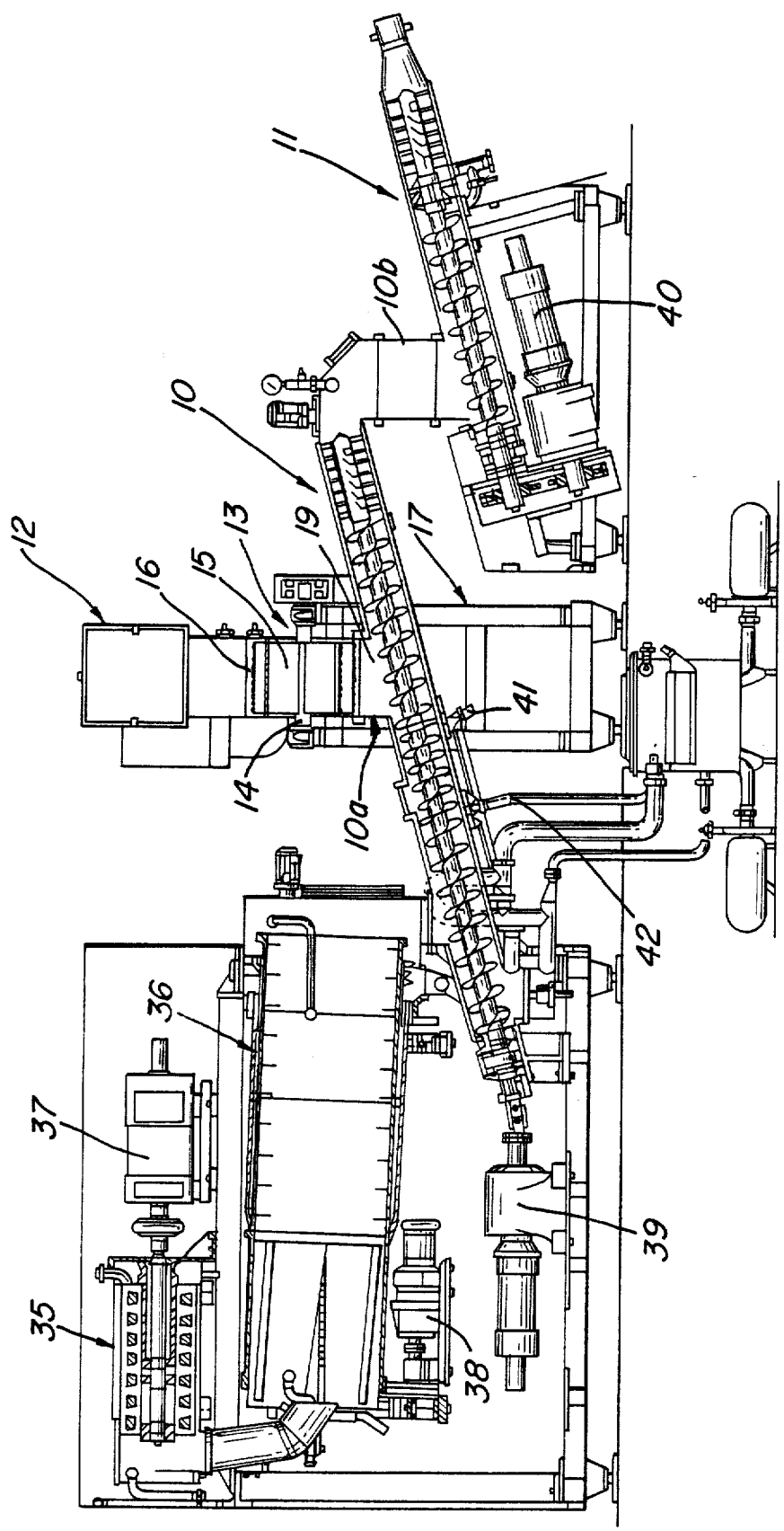
FIG. 1 is a schematic side view of a mechanical churn designed and operated in accordance with the invention.

The mechanical churn illustrated in FIG. 1 has a squeeze-off 10 that is upstream in the direction traveled by the butter grain and another squeeze-off 11 that is downstream in that direction. Squeezing off is accordingly a two-state process in a churn of this type.

The midsection of upstream squeeze-off 10 has an intermediate section 10a that is secured to the walls of the housing in a way that will not be specified herein. Above intermediate section 10a is a chopper 13 that chops fragments off of an unillustrated block of stored butter or pure fat and that will be described in greater detail later herein. Chopper 13 has a drum 15 that rotates on a horizontal shaft 14. The surface of the drum is covered with several blades 16 that extend over its total width. Horizontal shaft 14 is mounted in a stand 17 that will not be described in detail. Chopper 13 is driven by a motor that will not be described further except to say that its speed can be controlled. Above chopper 13 is a device 18, which will be described later herein with reference to FIG. 6, for continuously advancing a block of stored butter or fat to chopper 13.

With reference now to FIG. 1, chopper 13 is relatively remote from upstream squeeze-off 10. Between chopper 13 and squeeze-off 10, due to the slanting orientation of the squeeze-off, however, is a hopper 19. The four vertical sides of the hopper are closed off and its free end opens into the housing of squeeze-off 10.

Figure 2:
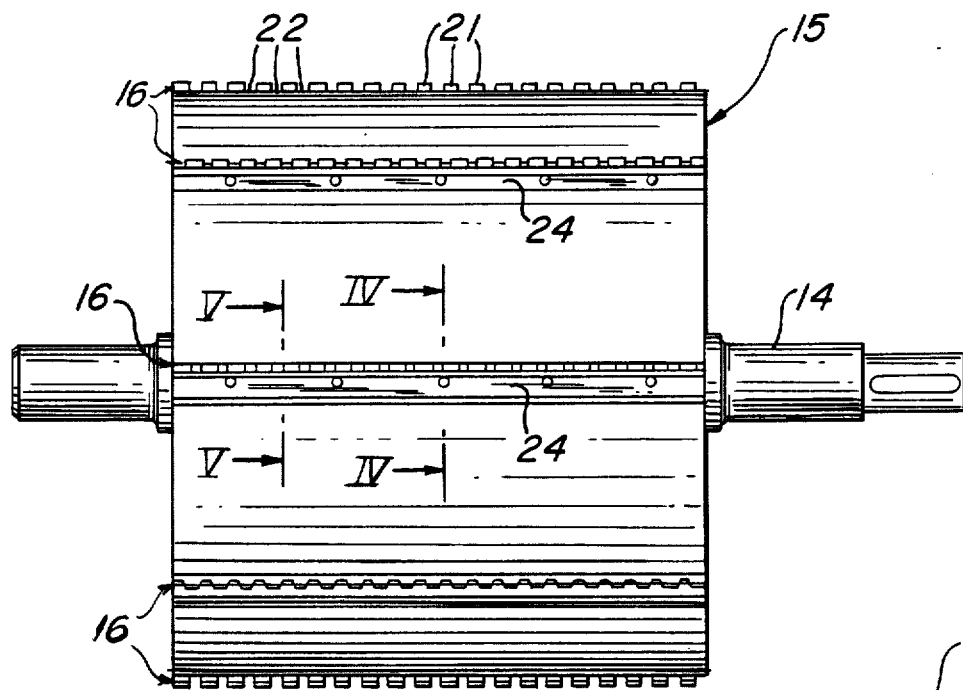
FIG. 2 is a side view of a chopper in the form of a drum provided with blades.
Figure 3:
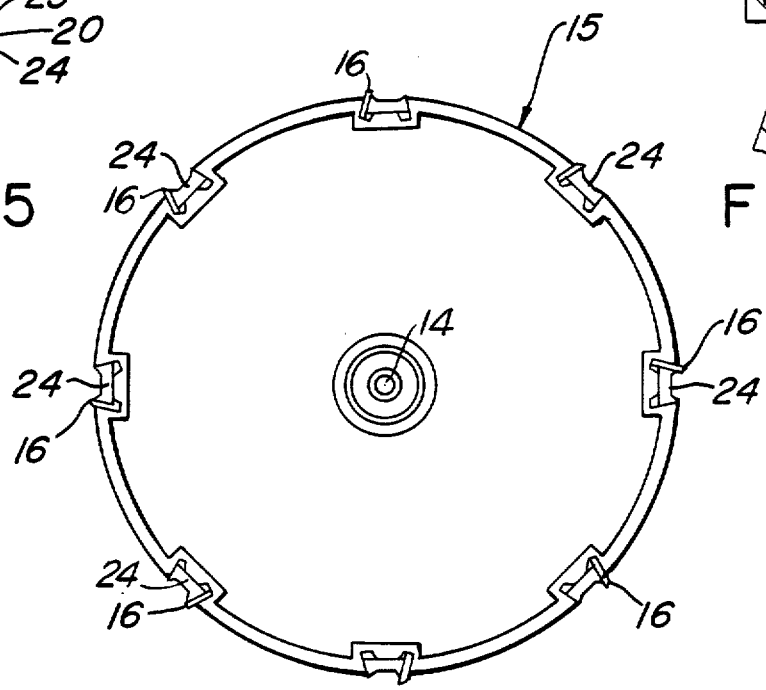
FIG. 3 is a front view of the chopper in FIG. 2.

With reference now to FIGS. 2 and 3, the drum 15 in the present embodiment has eight blades 16 that extend over its total width and are arrayed at the same angle to one another. Their cutting edges project out of the surface of the drum. Each blade also slants toward an imaginary tangent of drum 15. With particular reference to FIG. 2, the vicinity of the cutting edge of each blade has a number of recesses 22 that leave elevations 21 between them. The elevations in the present embodiment are slightly longer than recesses 22, resulting in a structure that will pare relatively narrow, chip-like fragments of butter from the block.

Figure 5:
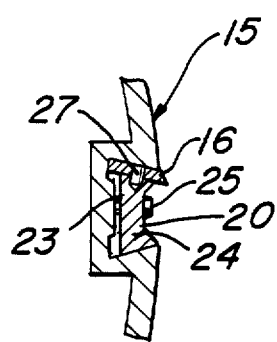
FIG. 5 is a section along the line V—V in FIG. 2.
Figure 4:
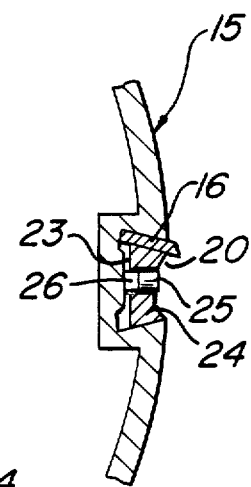
FIG. 4 is a section along the line IV—IV in FIG. 2.

As will be evident from FIGS. 3 through 5, each blade 16 is accommodated in a depression 23 that is trapezoidal in cross-section and extends over the total width of drum 15. The sloping walls that demarcate depressions 23, from horizontal shaft 14 outward, converge toward each other. Blades 16 are secured in trapezoidal cross-section depressions 23 by means of securing strips 24 that are also trapezoidal in cross-section. Each strip 24 is provided with several separated threaded bores that accommodate threaded pins 25. As will be evident from FIG. 4 in particular, the end of each pin 25 that faces shaft 14 has an extension 26 that is shorter in diameter. Threaded pins 25 can be employed in conjunction with securing strips 24 to radially loosen or tighten blades 16.

The embodiment illustrated in FIG. 5 also has positioning pins 27 extending into the blades at a right angle to their major plane.

Figure 6:
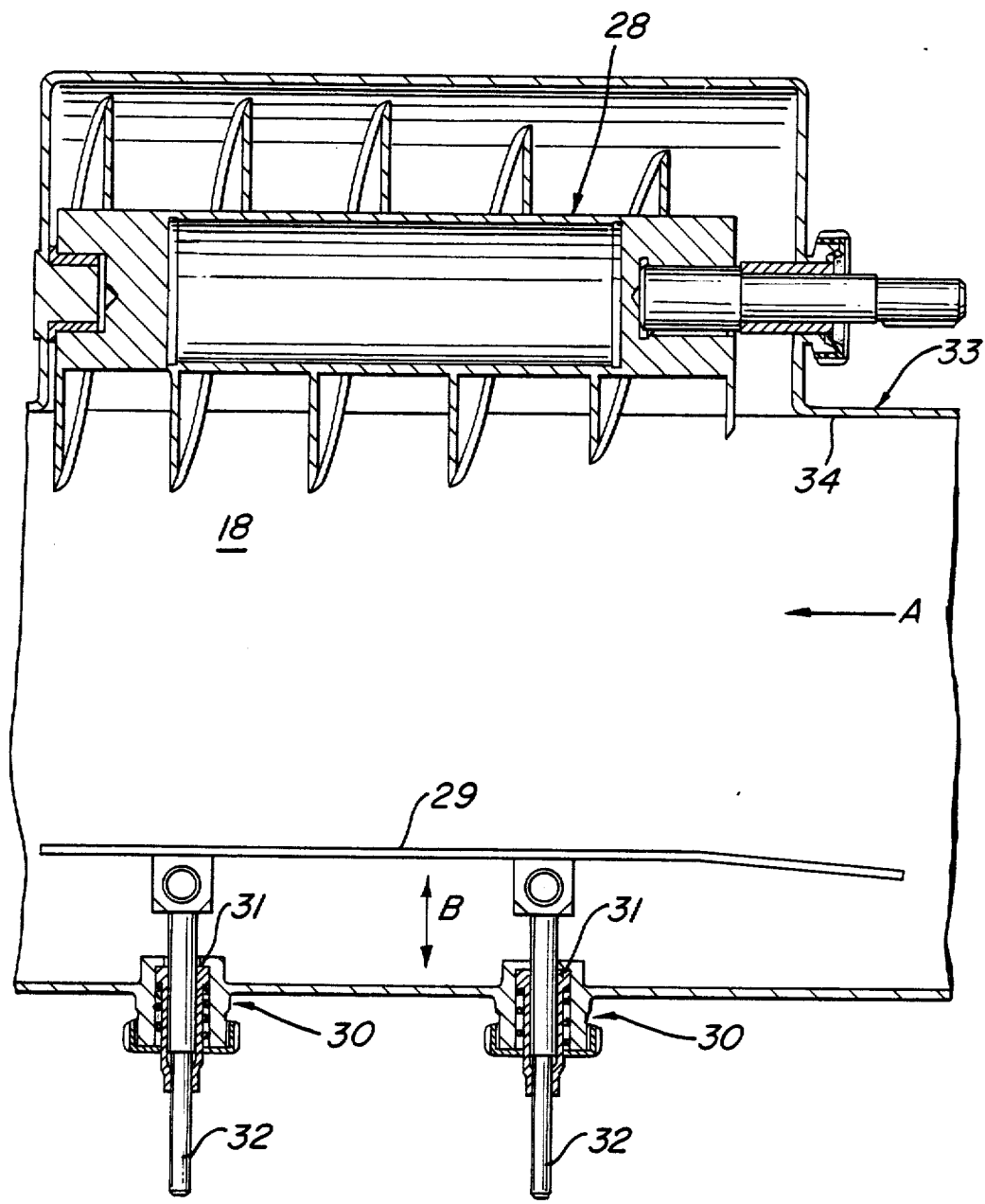
FIG. 6 is a section through part of the block-advance mechanism.

FIG. 6 illustrates a preferred embodiment of a mechanism for advancing blocks of different cross-sections into chopper 13. This mechanism includes a conveyor screw 28 powered by an unillustrated variable-speed drive mechanism. The unillustrated block is advance in the direction indicated by arrow A. As will be evident from FIG. 6, the outside diameter of the intake-end threads of conveyor screw 28 is shorter than that of the other threads. This measure facilitates cutting into the advancing block. At a certain distance from conveyor screw 28 is a plate 29 that secures the block against the screw and can be moved in the direction indicated by arrow B to position it at various distances away from the screw, making it possible to handle blocks of different cross-sections. Block-securing plate 29 is provided with several setting mechanisms 30, each consisting essentially of a spindle 32 that swivels on block-securing plate 29 and engages a rotating and spring-loaded threaded bushing 31. Bushings 31 can be adjusted either manually or by means of a motor.

Upstream of block-securing plate 29 in the direction A that the block is traveling in, the block-advance mechanism has a supply tube 33 that is open at the end facing conveyor screw 28. Since the free edges 34 of the supply tub are relatively near the axis of rotation of conveyor screw 28, the block being advanced does not extend beyond them.

Figure 7:
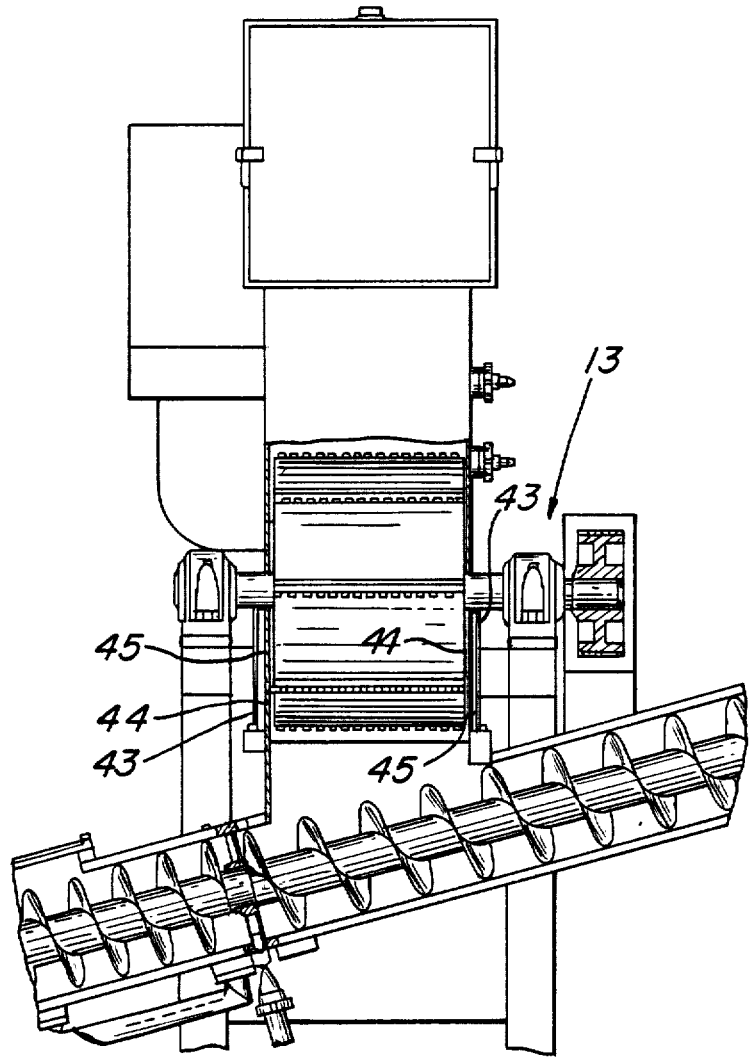
FIG. 7 is a schematic side view of a churn in an alternative embodiment according to the present invention.

The outer surface of the advance mechanism can, as shown in FIG. 7, be double-walled, meaning that it would have two separate demarcating surfaces 43, 44. Chilling or warming media can flow inside the space 45 between the two walls to bring the fragments of butter to the proper temperature for processing.

Chopper 13 can also have one or more flow-control mechanisms for introducing additives.

FIG. 1 illustrates two butter-making cylinders 35 and 36 upstream of upstream squeeze-off 10. Each butter-making cylinder 35 and 36 is driven by a variable-speed motor 37 and 38 respectively. One of the drive motors is back-geared.

Squeeze-offs 10 and 11 are also powered by variable-speed back-geared motors 39 and 40. Butter-making cylinder 36 has outlets for any buttermilk that may occur. Any buttermilk that still gets into upstream squeeze-off 10 is drained off through outlets 41,42.

As can be inferred from the foregoing description, the major components of the mechanical churn are supplied with individual variable drive mechanisms. To make it possible to vary the proportions of butter grain to butter fragments, the drive mechanisms are controlled by controls that are not described or illustrated herein.

It will be appreciated that the instant specifications and claims are set forth by way of illustration and not limitation, and that various modifications and changes may be made without departing from the spirit and scope of the present invention.

What is claimed is:

1. In a device for manufacturing butter, comprising: a continuous-operation mechanical churn with at least one butter-making cylinder for producing a mixture of buttermilk and butter grain, means for removing butter milk from the mixture and at least one squeeze-off means downstream of the churn, the improvement comprising at least one chopping means receptive of a block of butter or fat and located above a most upstream of the at least one squeeze-off means in terms of the direction that the butter grain moved in for chopping fragments from the block, wherein the chopping means has means for advancing the block and means for introducing the chopped fragments into the at least one squeeze-off means with the butter grain to produce a homogeneous billet of butter therefrom.

2. The device as in claim 1, wherein the means for introducing comprises a hopper with a free end opening into a housing for the at least one squeeze-off means.

3. The device as in claim 1, wherein the at least one chopping means comprises a rotating and powered drum with several blades that extend over the total width and having cutting edges extending from an outer surface of the drum.

4. The device as in claim 3, wherein the edges of the blades have recesses forming sharp elevations.

5. The device as in claim 4, wherein each elevation extends only a short distance along the width of the drum.

6. The device as in claim 3, wherein each blade slants down to an imaginary tangent to the circumference of the drum at the point where the blade emerges.

7. The device as in claim 3, further comprising means mounting each blade including means forming a trough that is deeper than the surface of the drum and faces the cutting edge of the blade.

8. The device as in claim 3, wherein the blades secured in the drum are oriented at the same angle to one another.

9. The device as in claim 3, further comprising means mounting the blades including a depression in the outside of the drum, trapezoidal in cross-section, for each blade, and a securing strip trapezoidal in cross-section and radially movably fitting into each depression.

10. The device as in claim 9, wherein each securing strip has an outer and free surface with a trough extending over its total length.

11. The device as in claim 9, wherein the drum has a horizontal shaft and wherein walls of the trapezoidal in cross-section depressions slant toward each other from the horizontal shaft of the drum and converge toward each other.

12. The device as in claim 1, wherein the means for advancing the block includes means forming a trough, a powered conveyor screw in the trough with its axis of rotation extending along the trough, and a block-securing plate positioned away from the screw and movable toward the screw.

13. The device as in claim 12, wherein the conveyor screw is powered by a variable drive mechanism.

14. The device as in claim 12, wherein the block-securing plate has at least one setting mechanism.

15. The device as in claim 14, wherein the setting mechanism comprises a threaded bushing and spindle.

16. The device as in claim 12, wherein the outside diameter of the threads at the intake end of the conveyor screw are shorter than that at the outlet end.

17. The device as in claim 1, wherein the upstream at least one squeeze-off means has an outlet for removing liquids in the vicinity of the chopping means.

18. The device as in claim 1, wherein at least one of the area of the upstream at least one squeeze-off means associated with the chopping means and the chopping means have two separated demarcating walls that create a hollow chamber and the hollow chamber subjected to a chilling or warming medium.

19. The device as in claim 1, wherein the chopper means has at least one channel for supplying additives.

20. The device as in claim 1, comprising several chopping means, each for one block of butter or fat, and positioned upstream of the upstream at least one squeeze-off means.

* * * * *